US005664872A

United States Patent [19]
Spearman et al.

[11] Patent Number: 5,664,872
[45] Date of Patent: Sep. 9, 1997

[54] COMBINED LAMP AND FAN ASSEMBLY

[75] Inventors: Robert Don Aldo Spearman, Crowborough; Alasdair Buchanan Howie, Brighton; David Vincent, Hassocks, all of United Kingdom

[73] Assignee: Smiths Industries PLC, London, England

[21] Appl. No.: 624,521

[22] PCT Filed: Nov. 4, 1994

[86] PCT No.: PCT/GB94/02422

§ 371 Date: Apr. 10, 1996

§ 102(e) Date: Apr. 10, 1996

[87] PCT Pub. No.: WO95/14884

PCT Pub. Date: Jun. 1, 1995

[30] Foreign Application Priority Data

Nov. 23, 1993 [GB] United Kingdom ............ 9324030

[51] Int. Cl.[6] .................................. F21V 29/00

[52] U.S. Cl. ..................... 362/96; 362/294; 362/373; 362/365

[58] Field of Search ........................... 362/96, 147, 148, 362/149, 364, 365, 373, 294

[56] References Cited

U.S. PATENT DOCUMENTS

| 2,010,004 | 8/1935 | Beggren ............................ 362/373 |
| 2,189,008 | 2/1940 | Kurth . |
| 2,258,731 | 10/1941 | Blumenthal ........................ 362/96 |
| 3,068,341 | 12/1962 | Ortiz et al. . |

Primary Examiner—Thomas M. Sember
Attorney, Agent, or Firm—Pollock, Vande Sande & Priddy

[57] ABSTRACT

A combined lamp and fan assembly has a housing with a central enclosure within which a low-voltage lamp is mounted. Air flow passages extend along the housing around the outside of the enclosure. The passages are open at their lower end and communicate at their upper end with a low-voltage fan removably secured to the upper end of the housing.

9 Claims, 4 Drawing Sheets

Fig.1.
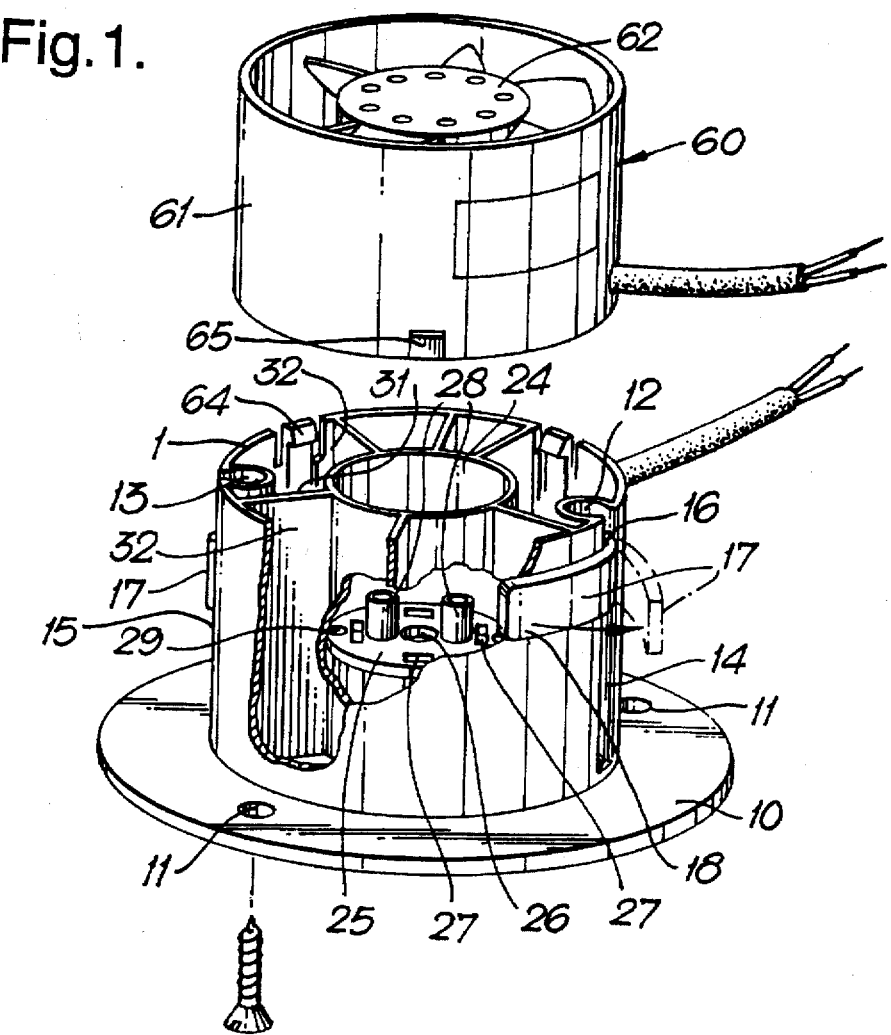
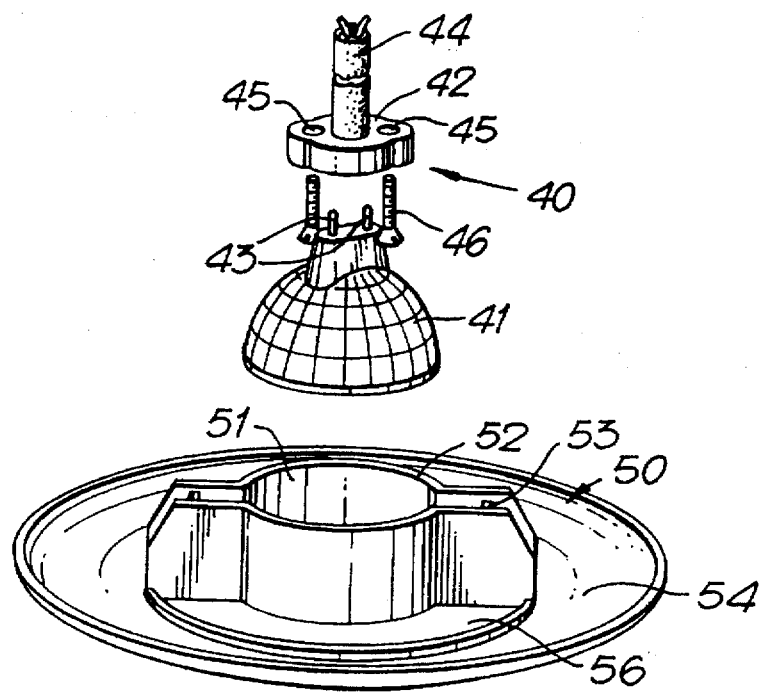

COMBINED LAMP AND FAN ASSEMBLY

TECHNICAL FIELD

This invention relates to a combined lamp and fan assembly comprising a first housing of substantially circular shape containing a lamp unit and having at least one air flow passage extending long the housing and opening at the lower end of the assembly, and a fan unit with a second housing.

BACKGROUND ART

In many applications, both ventilation and lighting are mounted in a ceiling panel, such as in bathrooms, showers, lavatories and kitchens. In U.S. Pat. No. 30,668,341 there is described a ceiling mounted light including a lamp, a heater and a fan.

DISCLOSURE OF INVENTION

It is an object of the present invention to provide a combined ventilation and lighting assembly of compact construction that can be installed in a ceiling panel through a small aperture and that can be easily maintained and adapted to provide lighting or ventilation only.

According to the present invention there is provided an assembly of the above-specified kind, characterized in that the second housing is of substantially the same diameter as the first housing, that the first and second housings have cooperating catches and notches whereby the second housing can be releasably retained at its lower end with the upper end of the first housing to form an extension thereof, the cooperating catches and notches providing the sole mounting for the second housing, and that the second housing opens at its upper end such that air can be drawn axially through the assembly.

The lamp unit is preferably located substantially centrally cross the width of the first housing with the or each air flow passage extending around the outside of the lamp unit. The lamp unit may be located within an enclosure, the enclosure being supported within the first housing by means of a plurality of radial supports. The lamp unit is preferably supported within the enclosure on a flange extending transversely of the enclosure, the flange having a vent aperture therethrough. The fan unit and lamp unit may be controllable separately. Preferably, the fan unit and lamp unit both operate at not more than 50 volts. The first housing may have an externally-extending flange at its lower end arranged to engage the underside of a ceiling panel. The assembly may include a removable bezel arranged to be retained to the lower end of the first housing, there being an air flow passage into the first housing via the bezel.

BRIEF DESCRIPTION OF THE DRAWINGS

A combined lamp and fan assembly in accordance with the present invention, will now be described, by way of example, with reference to the accompanying drawings, in which:

FIG. 1 is a perspective, exploded view of the assembly;

BEST MODES OF CARRYING OUT THE INVENTION

Figure 2:
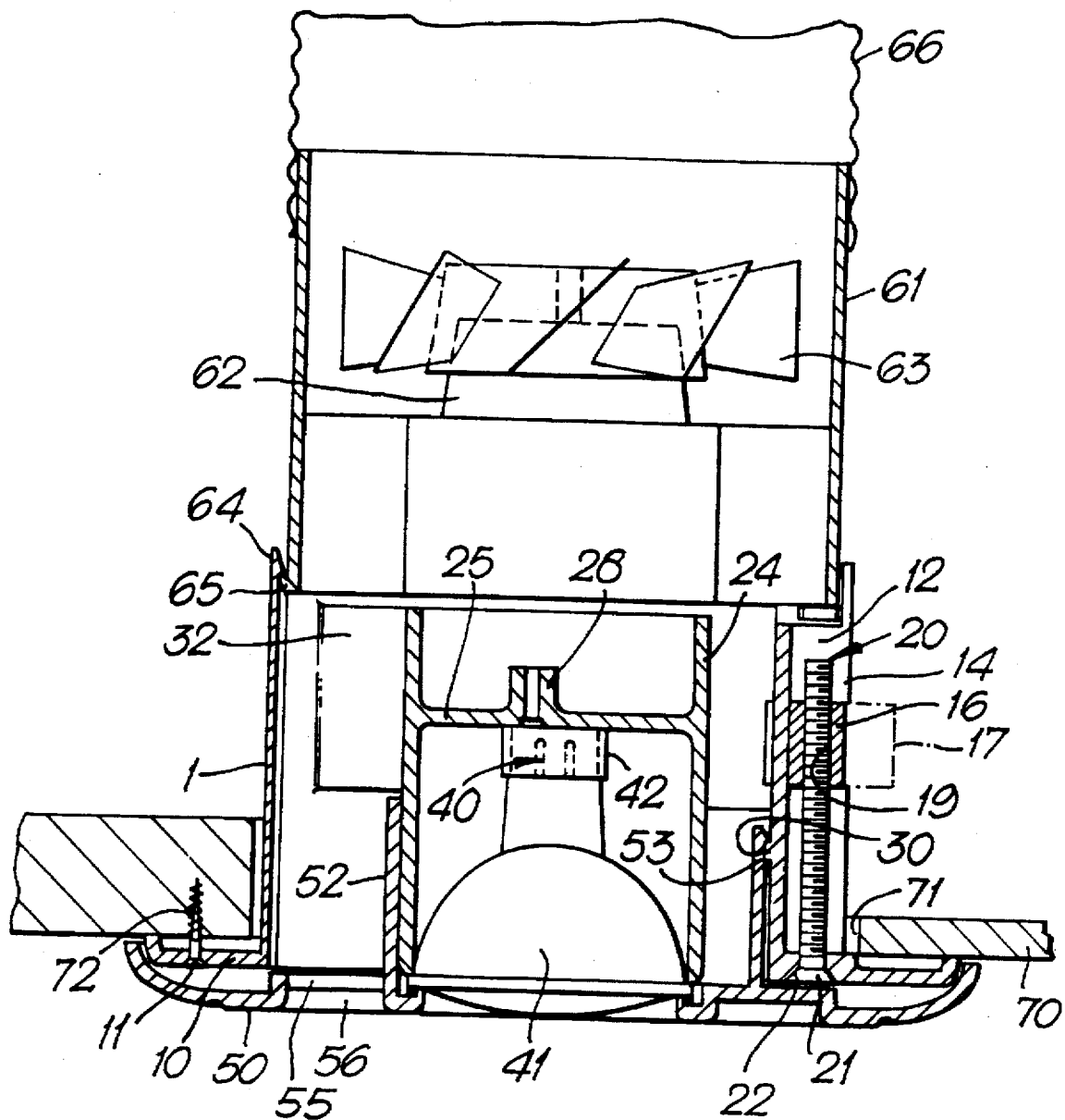
FIG. 2 is a sectional side elevation of the assembly.

With reference to FIGS. 1 and 2, the assembly has an outer housing I of an insulative plastics material and of a generally cylindrical shape. At its lower end, the housing 1 has a radially-projecting flange 10 with two screw-fixing holes 11. Two channels 12 and 13 of circular section extend vertically, opening externally of the housing via respective narrow slots 14 and 15. Each channel 12 and 13 contains the head 16 of a retaining member 17 having a curved finger 18, which projects horizontally out of the channel. The head 16 has a screw-threaded bore 19 receiving a threaded bolt 20, the head 21 of which is located in a recess 22 at, the lower end of the housing.

Internally, the housing 1 has a central, axial enclosure 24 of cylindrical shape and circular section, with a diameter about half that of the housing 1 so that there is an annular region between the enclosure and the housing. The enclosure 24 extends along a major part of the length of the housing, terminating a short distance above the lower end of the housing 1. The enclosure supports several radial, outwardly-extending webs 31, which divide the annular region between the outside of the enclosure 24 and the inside of the housing 1 into several vertical air flow passages 32. The airflow passages 32 extend along the length of the housing and are of arc-shape, extending around the outside of the enclosure 24. A mounting flange 25 extends transversely across the enclosure 24 about midway along its length, dividing the enclosure into an upper and lower part. The flange 25 is a horizontal disc with a central aperture 26 and four retaining slots 27 equally spaced around the aperture. Two internally-threaded bosses 28 project vertically upwards from the flange 25 on opposite sides of the aperture 26. The flange 25 also has several vent holes 29 (only one of which is shown) located around the periphery.

The flange 25 serves to support a 12 volt ac halogen lamp unit 40 centrally across the width of the assembly. The lamp unit 40 comprises a conventional combined bulb and dichroic reflector 41 and an insulating mount 42. The bulb 41 has two contact pins 43 projecting from its upper rear end, which are a push fit within electrical sockets in the mount 42. A twin core power supply wire 44 extends upwardly from the mount 42, through the central aperture 26 and through the side of the housing 1. The mount 42 has two apertures 45 through which two screws 46 are screwed into the bosses 28 on the flange 25.

The lower end of the housing 1 supports a decorative bezel 50. The bezel 50 has a central aperture 51 aligned with the bulb 41 and slightly smaller in diameter, so as to prevent the bulb falling out of the assembly if it should become loosened from the mount 42. The bezel 50 has an upwardly-projecting retaining collar 52, around the aperture 51, which has external recesses 53 shaped to receive internal catches 30 on the housing 1. The bezel 50 has a convex domed shape, when viewed from below, with an outer ring 54 supported by radially-projecting arms 55, which divide the bezel into two vent openings 56 of substantially semi-circular arc shape.

The assembly is completed by ventilation means in the form of an electric fan unit 60 secured to the upper end of the housing 1. The fan unit 60 has an outer housing 61 of cylindrical shape and is open at both ends. A 12 volt ac motor 62 is supported axially of the housing 61, to drive an axial fan 63. The lower end of the fan housing 61 sits within the upper end of the housing 1 and is releasably retained with it by engagement of spring catches 64 on the housing 1 with notches 65 on the outside of the fan housing. At its upper end, the fan housing 61 is joined to ducting 66. Alternative fans, such as a centrifugal fan, could be used. In some applications it is not necessary to connect the fan to ducting.

INDUSTRIAL APPLICABILITY

The assembly is installed in a ceiling panel 70 by curing a circular hole 71 with a diameter slightly larger than the external diameter of the housing 1. The upper, rear end of the assembly (either with or without the fan unit 60 in place) is then pushed into the hole 71 until the flange 10 contacts the ceiling panel 70. The assembly can be secured to the panel 70 in one of two ways. If the ceiling panel 70 were sufficiently thick and dense to retain a screw securely, the flange 10 could be secured to the panel 70 by screws 72 through the holes 11. Alternatively, or additionally, the retaining members 17 could be used. The head 21 of each bolt 20 is engaged by a screwdriver and rotated clockwise. Initially, this swings the fingers 18 outwardly in a clockwise sense (when viewed from below) to the limit of their rotation where they project at substantially right angles to the housing 1 beyond the edge of the hole 71, to overlap the panel 70. Further rotation of the bolts 20 causes the retaining members 17 to be pulled down along the channels 12 and 13 until they contact the upper surface of the panel 70. The bezel 50 is then held up to the assembly and pushed into position, thereby concealing the screws 72 and the bolts 20.

The fan unit 60 and lamp unit 40 can be controlled together or independently as desired. When the fan is on, air is drawn in via the bezel 50, through the openings 56, along the passages 32 and out of the upper end of the housing 1. Air then passes through the fan housing 61 and into the ducting 66.

Because the fan unit is removable from the lamp unit and both receive power independently of the other, it is possible to use the lamp without the fan or to use the fan without the lamp if desired. The housing 1 does not require any modification fit is to be used without the lamp unit 40 or without the fan unit 60. The lamp unit 40 can be attached to ducting without the fan unit so that heat generated by the lamp can flow away through the ducting.

Installation of the assembly is relatively easy because of the need to form only one opening in the ceiling panel. Maintenance is also simplified. The bulb 41 can be replaced by simply pulling off the bezel 50, which gives access to the bulb. When the fan unit 60 needs to be removed for cleaning or maintenance, the housing 1 is released from the ceiling panel 70 and the entire assembly is dropped through the aperture 71. The fan unit can then be unclipped from the housing 1.

The assembly provides a very compact installation, which is especially useful where space is limited. Because the air flow passages extend around the outside of the enclosure 24, and hence around the lamp unit 40 within the enclosure, it helps to cool the housing 1 and reduces the risk of heat damage. The fan unit 60 and lamp unit 40 are controllable separately so that it is possible to have either the fan or the lamp on by itself, or both together. The low voltage of the fan and the lamp reduces the risk of electrocution where water is present, such as in bathrooms and showers. Higher voltages of up to about 50 volts could also be used safely in such applications. In dry environments, the fan and lamp could operate at mains voltage, such as at 240 volts ac.

Figure 3:
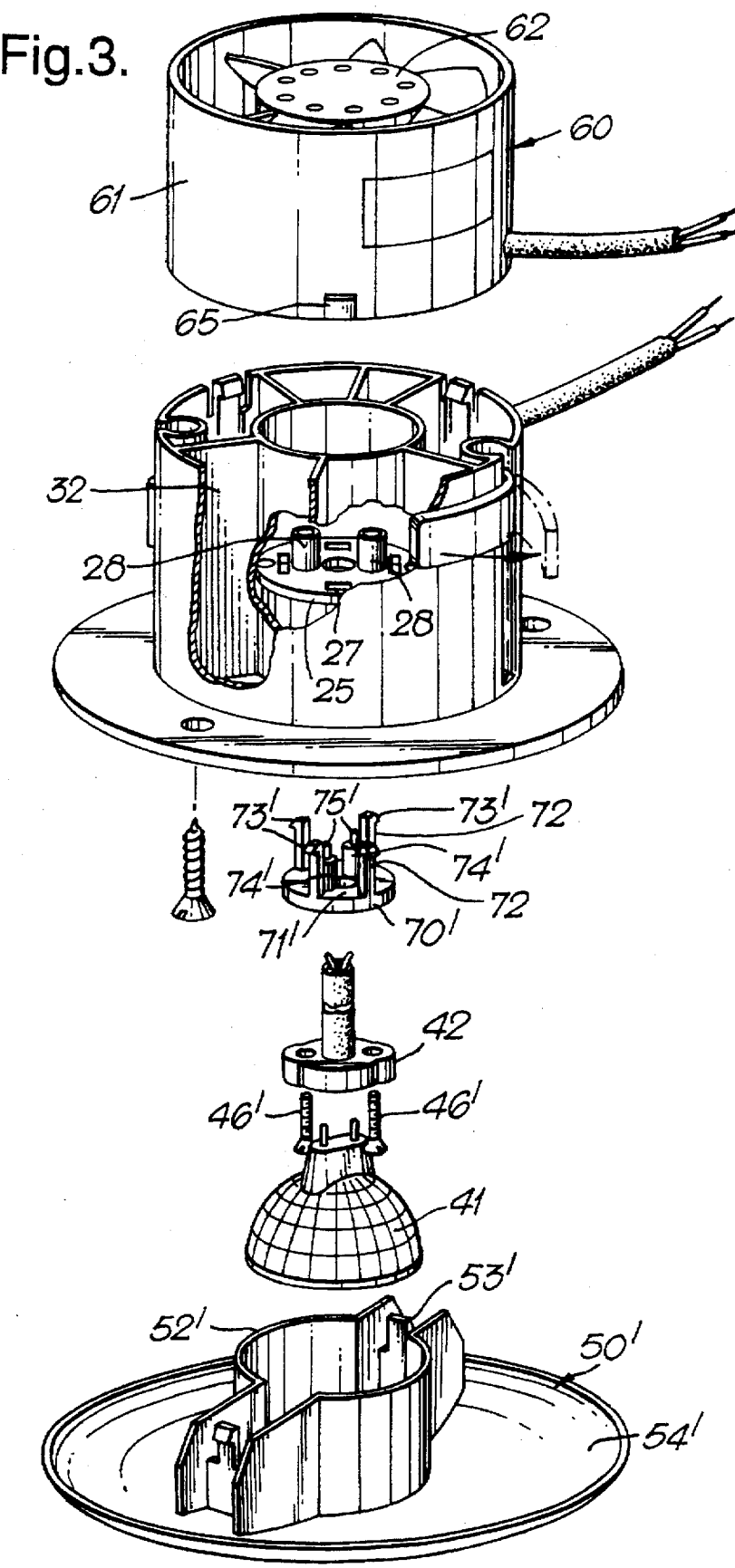
FIG 3 is a perspective, exploded view of a modified assembly.
Figure 4:
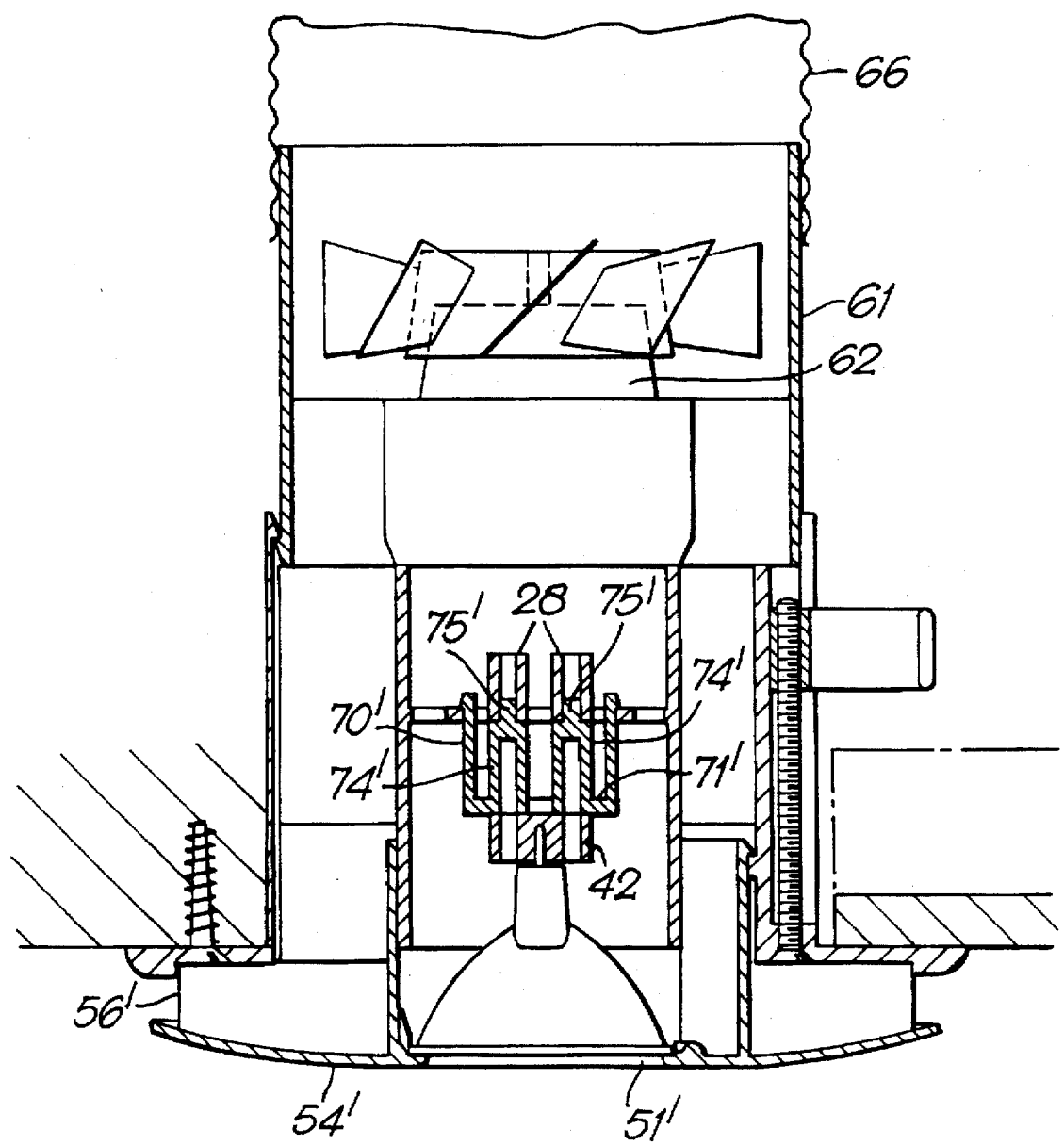
FIG. 4 is a sectional side elevation of the modified assembly of FIG. 3.

The assembly may have an alternative bezel 50', as shown in FIGS. 3 and 4, which conceals the air flow passages 32 by providing a lateral air intake. The bezel 50' has a retaining collar 52', which is about twice the length of the collar 52, so that the lower end of the bezel projects below and is spaced from the flange 10. The bezel 50' has a convex, domed annular plate 54' around the central aperture 51', without vent apertures. The edge of the plate 54' is spaced from the flange 10 by a gap forming an annular, lateral air intake 56', so that air can flow into the passages via the edge of the bezel. In order to give maximum light input, the bulb 41 is lowered by means of a spacer 70' fitted between the mount 42 and the flange 25. The spacer 70' is shaped like an inverted table with a horizontal platform 71' supporting four vertically-extending legs 72. The legs 72' have catches 73' at their upper ends, which engage in the retaining slots 27 in the flange 25. Two internally-threaded sleeves 74' project from the upper surface of the platform 71'. The sleeves 74' are open at their lower end and have locating studs 75' projecting from their upper end aligned with and located in the bosses 28 in the flange 25. Two screws 46' secure the mount 42 to the sleeves 74' in the spacer 70'. In this way, the two assemblies with axial or side air intakes can be provided with many common components.

Having thus described our invention, we claim:

1. A combined lamp and fan assembly comprising: a first housing of substantially circular shape containing a lamp unit and having an air flow passage extending along the housing and opening at a lower end of the assembly, said first housing including a fixing by which the assembly can be mounted in a hole in a ceiling panel in a room so that light from the lamp unit illuminates the room, said assembly also including a fan unit having a second housing which is of substantially a same diameter as the first housing, the first and second housings having cooperating catches and notches whereby a lower end of the second housing can be releasably retained at an upper end of the first housing to form an extension thereof, the cooperating catches and notches providing a sole mounting for the second housing, and the second housing being open at an upper end such that air can be drawn from the room through the ceiling panel axially through the assembly.

2. An assembly according to claim 1, wherein the lamp unit is located substantially centrally across a width of the first housing.

3. An assembly according to claim 2, wherein said air flow passage extends around an outside of the lamp unit.

4. An assembly according to claim 2 or 3 wherein said lamp unit is located within an enclosure that is supported within the first housing by means of a plurality of radial supports.

5. An assembly according to claim 4 wherein said lamp unit is supported within said enclosure on a flange extending traversely of the enclosure, said flange having a vent aperture therethrough.

6. An assembly according to claim 1, wherein said fan unit and said lamp unit are controllable separately.

7. An assembly according to claim 1, wherein said fan unit and lamp unit both operate at not more than 50 volts.

8. An assembly according to claim 1, wherein said fixing includes an externally-extending flange arranged to engage art underside of the ceiling panel.

9. An assembly according to claim 1, wherein the assembly includes a removable bezel arranged to be retained to the lower end of the first housing, and wherein there is an air flow passage into the first housing via the bezel.

* * * * *